United States Patent [19]

Belliot et al.

[11] 3,939,103

[45] Feb. 17, 1976

[54] CATALYTIC PRODUCT FOR THE OXIDATIVE DESTRUCTION OF GASEOUS ORGANIC COMPOUNDS AND METHOD FOR THEIR PREPARATION

[75] Inventors: Christian Belliot; Etienne Cheylan; Serge Madelaine; Johannes Ebbing, all of Paris, France

[73] Assignee: Compagnie Francaise Thomson Houston-Hotchkiss Brandt, Paris, France

[22] Filed: July 19, 1973

[21] Appl. No.: 380,721

Related U.S. Application Data

[62] Division of Ser. No. 203,833, Dec. 1, 1971, abandoned.

[30] Foreign Application Priority Data

Dec. 1, 1970 France .............................. 70.43189

[52] U.S. Cl.............. 252/455 R; 252/454; 252/471; 252/477 R; 423/213.2; 423/245
[51] Int. Cl.²...................... B01J 29/06; B01J 29/34
[58] Field of Search........ 252/455 R, 471, 472, 473, 252/454; 423/245, 213.2

[56] References Cited

UNITED STATES PATENTS

| | | | |
|---|---|---|---|
| 1,345,323 | 6/1920 | Frazer et al.......................... | 252/471 |
| 1,418,246 | 5/1922 | Frazer et al.......................... | 252/471 |
| 3,133,029 | 5/1964 | Hoekstra........................... | 423/213.2 |
| 3,150,922 | 9/1964 | Ashley .............................. | 423/213.2 |
| 3,433,581 | 3/1969 | Stephens et al................. | 423/213.2 |
| 3,436,356 | 4/1969 | Kato et al. ....................... | 423/213.2 |
| 3,498,928 | 3/1970 | Cho et al. ........................ | 423/213.2 |
| 3,663,457 | 5/1972 | Tamura et al. ..................... | 252/471 |

*Primary Examiner*—Arthur P. Demers
*Attorney, Agent, or Firm*—Edwin E. Greigg

[57] ABSTRACT

A catalyst for the oxidative destruction of gaseous organic compounds comprises 50–80% of a mixture of active carbonates and oxides, i.e., 50–85% of manganese oxides, 0–30% of manganous carbonate, 3–10% of cupric oxide, and 0–15% of nickel oxides; and 50–20% of a cold-shapable refractory excipient. Organic compounds oxidized by the catalysts of this invention including xylenoles, pyridine, methylpyrrolidone, sulfur heterocyclics, etc.

15 Claims, No Drawings

CATALYTIC PRODUCT FOR THE OXIDATIVE DESTRUCTION OF GASEOUS ORGANIC COMPOUNDS AND METHOD FOR THEIR PREPARATION

This is a division of application Ser. No. 203,833, filed Dec. 1, 1971, now abandoned.

This invention relates to improvements in catalytic products capable of guaranteeing destruction, by oxidation, of harmful or malodorous gases and vapors of organic origin, as well as their preparation method and their uses. By way of particularly advantageous uses, one might mention the destruction of vapors of toxic solvents coming from varnishing or enamelling installations, plastic treatment installations, installations for the pyrogenation (burning) of household and similar garbage, as well as engine exhaust gases.

Known catalytic products for the destruction of gases and vapors of organic origin frequently have a precious metal base; consequently, they are expensive and they are sensitive to contamination by various impurities.

The catalytic products of this invention are economical and have good mechanical strength. These products made by the method of the invention, starting with the improved catalytic compounds resulting from one particular combination of certain metal oxides and excipient, make it possible efficiently to employ the property of these oxides to catalyze the oxidation of a large number of organic compounds which generally are responsible for the odor and toxicity of the residual vapors of many industrial establishments and which resist all economical treatments known until now.

According to the invention, these catalytic compounds include:
  Manganese oxides, 50–85%,
  Manganous carbonate, 0–30%,
  Cupric oxide, 5–10%,
  Nickel oxides, 0–15%.

The excipient added to these catalytic compositions is preferably a cement or a clay-base refractory product. The cement or clay-base refractory product represents 20–50% and preferably 30% of the total weight of the mixture obtained; according to the invention, it serves especially as a refractory binding agent, giving good mechanical strength to the components of this mixture in the conditioning process as for various forms of the final catalytic product. For example, the cement or clay-base refractory product makes it possible to cold-shape this mixture into any geometrical form desired or to keep this mixture on any desired support of metal or refractory material, which is presented in the form of a honeycomb block, plate, grid (grill), or sheet.

In the oxidative destruction of harmful or foul-smelling gases and vapors, of organic origin, at temperatures below 300°C, the optimum composition for the catalytic product according to the invention is as follows:
  Manganese oxide 50%,
  Manganous carbonate 30%,
  Cupric oxide 10%,
  Nickel oxides 10%,
  Cement or clay-base refractory product (excipient).

These oxides, according to the invention, result from the open-air heating reaction, performed at a moderate temperature of the order of 300°C, that is, from heating of a mixture of corresponding metallic carbonates and hydroxycarbonates, including about 80% manganous carbonate, 10% cupric hydroxycarbonate, and 10% nickel hydroxycarbonate. This moderate heating temperature consequently leaves intact a certain proportion of residual manganous carbonate and yields manganese dioxide of a particular physical shape, in the form of elementary grains on the order of a micron in a crystalline form retaining the structure of the rhombohedric form of the generating (precursor) manganous carbonate.

The optimum composition of the catalytic product according to this invention for the oxidative destruction of harmful or foul-smelling gases and odors of organic origin at temperatures above 300°C is as follows:
  Manganese oxides 80%,
  Cupric oxide 10%,
  Nickel oxides 10%,
  Cement or clay-base refractory products (excipient).

These oxides of this invention are obtained from the open-air heating reaction, at a temperature of 600°–1,000°C, of a mixture of corresponding metallic carbonates and hydroxycarbonates, including about 80% manganous carbonate, 10% cupric hydroxycarbonate, and 10% nickel hydroxycarbonate. This heating temperature guarantees total transformation of the carbonates and hydroxycarbonates of said mixture into oxides which will be active in the composition of the final catalytic product.

By way of illustration, we give below some descriptive examples for preparing catalytic products according to the invention.

EXAMPLE 1

We mix saturated aqueous solutions of:

| | |
|---|---|
| $MnCl_2 \cdot 4 H_2O$ | 949 g. |
| $CuCl_2 \cdot 2 H_2O$ | 41 g. |
| $NiCl_2 \cdot 6 H_2O$ | 194 g. | and we add the mixture to a saturated solution of $NH_4HCO_3$ (951 g.) or an excess of 5% ammonium bicarbonate. A mixture of hydroxycarbonates of manganese, of copper, and of nickel precipitates. To this we add 400 g. of cement or clay-base refractory product in order to make out of it a paste which will be more or less thick, depending upon the requirements of making the form which we have given to the final catalytic product. A paste, which flows easily, facilitates impregnating honeycomb supports or supports in the form of a sheet. Medium consistency makes it possible to deposit the paste on metallic or refractory supports that have the shape of a plate, grill, or rod and it is easier for the paste to stick to these supports. A thick paste makes it possible — by means of molding or extrusion — to make any desired geometrical shape, such as a disc, a tube, a briquette, a granule, a little stick, or a ring. After the cement has set or after the clayey refractory product has dried the mixture thus shaped, with or without support, is subjected to heating in an oven or ventilated kiln; it is heated to 30°C. in order in situ to perform in a progressive manner, reactions of the following type which transform the carbonates, supported by the refractory binding agent, into oxides:

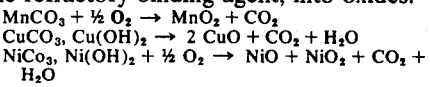

This open-air heating operation:

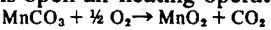

stops at about 60% with respect to the manganese used.

The catalytic product thus obtained contains about

55% manganese oxides
30% manganous carbonate
5% cupric oxide
10% nickel oxides kept firmly in place by the cement or the clay-base refractory product. The catalytic product, which retains intact the shape which it received prior to heating, now has a very porous structure, created during the heating by expulsion of carbon dioxide, and is now ready to be placed in a stream of gas or vapors of organic origin which must be destroyed, in order to catalyze their oxidation.

EXAMPLE 2

A mixture of hydroxycarbonates of manganese, copper, and nickel is obtained in the same manner as described in Example 1.

This mixture is dried and placed in a ventilated stove and it is heated to 300°C. in order to perform the reactions of the type mentioned in Example 1 which transform the carbonates into oxides. Open-air heating:

$$MnCO_3 + \tfrac{1}{2} O_2 \rightarrow MnO_2 + CO_2$$

reaches a top at about 60% with respect to the manganese used.

The catalytic compounds thus obtained include:
55% manganese oxides,
30% manganous carbonate,
5% cupric oxide,
10% nickel oxides.

These catalytic compounds are mixed with cement or clayey refractory product whose weight represents about 30% of the total weight of the mixture, in order, as in Example 1, to make up a paste which will be more or less thick, according to the requirements of making the desired shape of the final catalytic product. After the cement has set or after the clayey refractory product has dried, the catalytic product obtained has good mechanical strength and is ready for use in the oxidative destruction of harmful or foul-smelling gases and vapors of organic origin.

We found, rather surprisingly, that starting at about 180°C, it is possible by passing gaseous organic compounds over catalytic products obtained in accordance with Examples 1 and 2 to accomplish the total combustion of gaseous organic compounds, e.g., the residues of engine gases and furnace gases from varnishes and solvents, which were either completely resistant to any destructive treatment or which were sensitive only to catalysts based on a precious metal.

Examination of the catalytic products of Examples 1 and 2 microscopically and by x-rays indicates that the manganese dioxide obtained in the form of grains on the order of a micron retains the spectrum of rhodocrosite (natural manganese carbonate) which has a rhombohedric crystalline structure. This particular structure of manganese dioxide and the great porosity of the catalytic product made enables us to obtain exceptional catalytic activity of this product at low temperatures. Temperatures for the transformation of the carbon monoxide into $CO_2$ can be as low as −40°C.

EXAMPLE 3

A mixture of hydroxycarbonates of manganese, of copper, and of nickel is obtained in the same fashion as described in Example 1. This mixture is subjected to forceful desiccation and it is then heated progressively in contact with air at a temperature of about 650°C, until we get a content of about 55% total dioxides (expressed as $MnO_2$) determined by titration with oxalic acid.

After heating, the carbonates and hydroxycarbonates are totally transformed into oxides. The mixture obtained includes about:
85% manganese oxide,
5% copper oxide,
10% nickel oxides.

Cement or clay-base refractory product is added to these oxides in order, as in Example 1, to make a paste which will be more or less thick, depending upon the requirements of making the shape we want to give to the final catalytic product. The weight of the cement or the clayey refractory product used represents 20–50%, or preferably 30% of the total weight of the oxides-cement mixture. After the cement sets or after the clayey refractory product is dry, the catalytic product obtained has good mechanical strength, regardless of the form which we give it. This catalytic product is ready for use in the oxidative destruction of harmful or foul-smelling gases and vapors of organic origin, preferably at a temperature about 300°C.

The catalytic products of the invention described above make it possible, in an economical fashion, to accomplish the oxidative destruction of toxic and foul-smelling industrial organic products such as cyclic and heterocyclic products, e.g., pyridine and its homologues, methylpyrrolidone, the sulfurated heterocycles present as permanent impurities in solvents, e.g., the cresols, the xylenols, methylisobutylketone, butyl acetate, ethylene glycol acetates, etc.

We can establish the effectiveness of this destruction by at least three means. The first consists of the disappearance of the odor of the vapors treated. This means is extremely effective because the compounds involved, as is known, have an intolerable ordor, even with a content of just a few ppm per cubic meter. Disappearance of any perceptible odor is thus proof of the destruction of these compounds down to the very smallest traces.

The second means consists in a quantitative evaluation of the possible residues of compounds involved here using a Draeger tube. By this means, we exercise visual assay of the effectiveness of the reaction by colored reagents.

Finally, the third means consists of gas-phase chromatography of the gas to be treated, before and after passage over the catalyst.

Results from these three means agree with each other. For example, gas having a content of 6 g./m.$^3$ of xylenol (the usual content of gases in kilns used to enamel-coat electrical wires), obtained by bubbling air in xylenol at ambient temperature, and subjected to catalytic oxidation treatment over a catalyst made according to Examples 1 and 2, but without any nickel, is freed of xylenol starting at 220°C; with the same catalyst, but containing nickel, this temperature is lowered to 180°C.

Similar tests made at levels of pyridine and methylpyrrolidone of the same order, gave entirely similar results.

The mixture perfected, according to the invention, of catalytic compounds and excipient, such as cement or a clay-base refractory product, enables us to obtain catalytic compounds giving excellent flexibility in terms of their being shaped into a final catalytic product offering great mechanical strength. Good mechanical strength prevents premature breakup of the catalytic product and, by virtue of this fact, prolongs its lifetime and its effectiveness. The wide variety of forms which can be given to the catalytic product in the invention and its mechanical strength, enables us substantially to enlarge the possibilities of designing installations involving the oxidative destruction of harmful and foul-smelling gases and vapors.

What is claimed is:

1. A catalyst for the oxidative destruction of gaseous organic compounds, which comprises between about 80 and about 50% of total catalyst weight of active ingredients and from about 20 to about 50% of total catalyst weight of a cold-shapable refractory excipient, wherein the active ingredients comprises from about 50% to about 85% by weight of rhombohedral manganese oxides, from 0 to about 30% by weight of manganous carbonate, from about 3 to about 10% by weight of cupric oxide, and from 0 to about 15% by weight of nickel oxides.

2. The catalyst of claim 1, wherein the refractory excipient is a cement.

3. The catalyst of claim 1, wherein the refractory excipient is a refractory earth.

4. The catalyst of claim 1, wherein the refractory excipient comprises about 30% of total catalyst weight and the active ingredients comprising about 70% of total catalyst weight comprise about 55% by weight of manganese oxides about 30% of manganous carbonate, about 5% of cupric oxide, and about 10% of nickel oxides.

5. The catalyst of claim 1, wherein the refractory excipient comprises about 30% of total catalyst weight and the active ingredients comprising about 70% of total catalyst weight comprise between about 80% and about 85% by weight of manganese oxides, between about 5% and about 10% by weight of cupric oxides, and between about 5% and about 15% by weight of nickel oxides.

6. The catalyst of claim 1, wherein the catalyst is shaped in a configuration selected from the group of configurations consisting of briquettes, rings, tubes, balls, rods, and granules.

7. The catalyst of claim 1, wherein said catalyst is supported on a shaped substrate, the shaped substrate having a configuration selected from among sheets, honeycombs, plates and grills.

8. The catalyst of claim 1, wherein said catalyst is supported on a substrate selected from refractory and metal substrates.

9. A method of making the catalyst of claim 1, which comprises:
treating saturated aqueous solutions of a soluble manganese salt, a soluble cupric salt, and a soluble nickel salt in ratios to yield from about 50 to about 85% by weight of manganese, from about 3% to about 10% by weight of copper, and from 0 to about 15% by weight of nickel with at least 5% excess of a saturated solution of a bicarbonate salt to obtain a precipitate of combined manganese, cupric, and nickel carbonates and hydroxycarbonates and a supernatant mother liquor;
adding to the precipitate of combined carbonates and hydroxycarbonates and the supernatant mother liquors a cold-shapable refractory excipient, wherein the excipient comprises from about 20% to about 50% of total weight, to form a paste;
shaping the paste to form particles of a definite geometrical configuration;
and heating the particles of a defined geometrical configuration in air at a temperature of at least 300°C.

10. A method of making the catalyst of claim 1, which comprises:
preparing a mixture containing between about 50% and about 85% by weight of manganous carbonate, between about 3% and about 10% by weight of cupric hydroxycarbonate, and from 0 to about 15% by weight of nickel hydroxycarbonate;
incorporating in the mixture from about 20% to about 50% of total weight of a refractory excipient, selected from a cement and a refractory earth, to form a paste;
fabricating the paste into a definite geometrical configuration;
and heating said paste fabricated into a definite geometrical configuration in air at a temperature of at least 300°C.

11. A method of making the catalyst of claim 1, which comprises:
preparing a mixture containing between about 50% and about 85% by weight of manganous carbonate, between about 3% and about 10% by weight of cupric hydroxycarbonate, and from 0 to about 15% of nickel hydroxycarbonate;
incorporating in the mixture from about 20% to about 50% of total weight of a refractory excipient, selected from a cement and a refractory earth, to form a paste;
depositing the paste on a shaped substrate selected from refractory and metallic substrates; and
heating said paste on the shaped substrate in air at a temperature of at least 300°C.

12. A method of making the catalyst of claim 1, which comprises:
preparing a mixture containing between about 80% and about 85% by weight of manganous carbonate, between about 5% and about 10% by weight of cupric hydroxycarbonate, and between about 5% and about 15% by weight of nickel hydroxycarbonate;
drying the mixture and heating the mixture in air at a temperature above 300°C;
incorporating in the mixture dried and heated in air an excipient, selected from cement and a refractory earth to make from about 30% to about 50% by weight of catalyst obtained, to form a paste;
fabricating the paste into a definite geometrical configuration; and
permitting said paste to harden.

13. A method of making the catalyst of claim 1, which comprises:
preparing a mixture containing between about 80% and about 85% by weight of manganous carbonate, between about 5% and about 10% by weight of cupric hydroxycarbonate, and between about 5% and about 15% by weight of nickel hydroxycarbonate;
drying the mixture and heating the mixture in air at a temperature above 300°C;
incorporating in the mixture dried and heated in air an excipient, selected from cement and a refractory earth to make from about 30% to about 50% by weight of catalyst obtained, to form a paste;
depositing the paste on a shaped metallic substrate; and
permitting said paste to harden.

14. The method of claim 10, wherein said paste fabricated into a definite geometrical configuration is heated in air at a temperature between about 600°C and about 1000° C.

15. The method of claim 12, wherein said mixture is dried and heated in air at a temperature between about 600°C and about 1000°C.

* * * * *